US012716367B1

(12) United States Patent
Tomes et al.

(10) Patent No.: US 12,716,367 B1
(45) Date of Patent: Aug. 25, 2026

(54) BEARING SUPPORT HAVING ARCUATE DAMPER ELEMENTS

(71) Applicant: Pratt & Whitney Canada Corp., Longueuil (CA)

(72) Inventors: Nathan Tomes, Hamilton (CA); Tyler Richardson, Toronto (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 19/233,457

(22) Filed: Jun. 10, 2025

(51) Int. Cl.
*F01D 25/16* (2006.01)
*F16C 35/02* (2006.01)

(52) U.S. Cl.
CPC ............ *F01D 25/164* (2013.01); *F16C 35/02* (2013.01); *F05D 2240/50* (2013.01); *F05D 2260/96* (2013.01); *F16C 2360/23* (2013.01)

(58) Field of Classification Search
CPC ............... F01D 25/164; F05D 2240/50; F05D 2260/96; F16C 35/02; F16C 2360/23
See application file for complete search history.

(56) References Cited

U.S. PATENT DOCUMENTS

| | | | | |
|---|---|---|---|---|
| 5,088,840 | A * | 2/1992 | Radtke | F16C 27/045 384/535 |
| 7,431,504 | B1 | 10/2008 | Pelfrey | |
| 8,337,090 | B2 | 12/2012 | Herborth et al. | |
| 11,021,998 | B2 | 6/2021 | Ganiger et al. | |
| 11,466,588 | B2 | 10/2022 | Kiely et al. | |
| 2010/0220948 | A1* | 9/2010 | Singh | F16C 27/066 384/477 |
| 2011/0058759 | A1* | 3/2011 | Herborth | F16C 27/045 384/55 |
| 2019/0353052 | A1* | 11/2019 | Ganiger | F01D 25/164 |
| 2021/0180651 | A1* | 6/2021 | Witlicki | F16C 35/077 |

* cited by examiner

*Primary Examiner* — Andrew J Marien
(74) *Attorney, Agent, or Firm* — CANTOR COLBURN LLP

(57) ABSTRACT

Bearing damper systems for gas turbine engines include a bearing structure and, a housing arranged outward from the bearing structure and defining a plurality of axially extending recesses arranged circumferentially about the axis. A set of energy dissipating elements are arranged within the recesses and are axially constrained therein. The energy dissipating elements are arranged to receive a radial outward force from the bearing structure. Each energy dissipating element may be radially compressed while being axially constrained in response to a radial movement of the bearing structure and enter a loaded state with energy associated with the compression is absorbed into the material of the energy dissipating element. Each energy dissipating element is configured to convert at least a portion of the absorbed energy to heat and is configured to return to an unloaded state after removal of the load from the bearing structure.

20 Claims, 10 Drawing Sheets

BEARING SUPPORT HAVING ARCUATE DAMPER ELEMENTS

BACKGROUND

Embodiments of the present disclosure pertain to the art of gas turbine engines, and more particularly to bearing support systems thereof.

Aircraft engines, such as main engines and auxiliary power units, rely upon rotating components to generate thrust and/or power. The rotating components are mounted to, rotationally attached, and/or integrated as a single piece with one or more engine shafts within the engine. The engine shafts are typically supported on one or more bearing assemblies. Squeeze film dampers may be used between some bearing outer races and associated bearing housings of the bearing assemblies. Squeeze film dampers may be used to improve rotor stability, allow transit through resonance speeds without damaging hardware, decrease vibrations during operation of the gas turbine engines, and/or reduce vibrations transmitted from the engine to the airframe. Most squeeze film dampers require an additional load path to center the rotor, such as by using a squirrel cage.

BRIEF DESCRIPTION

According to some embodiments, bearing damper systems for gas turbine engines are provided. The bearing damper systems include a bearing structure arranged about an axis, a housing arranged radially outward from the bearing structure relative to the axis, the housing defining a plurality of axially extending recesses arranged circumferentially about the axis, and a set of energy dissipating elements, wherein one energy dissipating element of the set of energy dissipating elements is arranged within each recess of the housing and axially constrained within the respective recess, the energy dissipating elements arranged to receive a radial outward force from the bearing structure. Each energy dissipating element is arranged to be radially compressed while being axially constrained in response to a radial movement of the bearing structure toward the respective energy dissipating element and enter a loaded state wherein energy associated with said compression is absorbed into the material of the respective energy dissipating element. Each energy dissipating element is configured to convert at least a portion of the absorbed energy to heat and configured to return to an unloaded state after removal of the load from the bearing structure.

In addition to one or more of the features described herein, or as an alternative, further embodiments of the bearing damper systems may include that each energy dissipating element is made from a MAX Phase material.

In addition to one or more of the features described herein, or as an alternative, further embodiments of the bearing damper systems may include that each energy dissipating element is made from a MAX Phase ceramic.

In addition to one or more of the features described herein, or as an alternative, further embodiments of the bearing damper systems may include that each energy dissipating element is maintained under a preload that applies a radial inward force to the bearing structure.

In addition to one or more of the features described herein, or as an alternative, further embodiments of the bearing damper systems may include that a cavity is defined between a surface of each energy dissipating element and a surface of a respective recess of the housing.

In addition to one or more of the features described herein, or as an alternative, further embodiments of the bearing damper systems may include that the housing comprises one or more cooling channels configured to receive a working fluid and direct the working fluid into a respective cavity associated with each of the plurality of energy dissipating elements.

In addition to one or more of the features described herein, or as an alternative, further embodiments of the bearing damper systems may include that the plurality of energy dissipating elements define a first set of energy dissipating elements, the system further comprising a second set of energy dissipating elements, wherein the energy dissipating elements of the second set of energy dissipating elements are axially offset from the energy dissipating elements of the first set of energy dissipating elements.

In addition to one or more of the features described herein, or as an alternative, further embodiments of the bearing damper systems may include that the energy dissipating elements of the second set of energy dissipating elements are circumferentially offset from the energy dissipating elements of the first set of energy dissipating elements.

In addition to one or more of the features described herein, or as an alternative, further embodiments of the bearing damper systems may include that the bearing structure is retained within the housing in an axial direction between a stop of the housing and a locking element.

In addition to one or more of the features described herein, or as an alternative, further embodiments of the bearing damper systems may include an intermediate structure arranged between the energy dissipating elements and the bearing structure, wherein the intermediate structure contacts the energy dissipating elements on one side and the bearing structure on an opposite side.

In addition to one or more of the features described herein, or as an alternative, further embodiments of the bearing damper systems may include a squeeze film damper defined between the intermediate structure and the bearing structure.

In addition to one or more of the features described herein, or as an alternative, further embodiments of the bearing damper systems may include that the bearing structure comprises a squirrel cage.

In addition to one or more of the features described herein, or as an alternative, further embodiments of the bearing damper systems may include that each energy dissipating element is formed from a material that converts at least 20% of strain energy to heat.

In addition to one or more of the features described herein, or as an alternative, further embodiments of the bearing damper systems may include that the housing comprises at least one anti-rotation feature defined at an end of the recess and configured to receive an end of an energy dissipating element to prevent rotation of the end of the energy dissipating element during a compression-release cycle.

In addition to one or more of the features described herein, or as an alternative, further embodiments of the bearing damper systems may include that each energy dissipating element comprises at least one anti-rotation feature defined at an end of the respective energy dissipating element, wherein the at least one anti-rotation feature is configured to engage with a slot defined within the housing to prevent rotation of the end of the energy dissipating element during a compression-release cycle.

In addition to one or more of the features described herein, or as an alternative, further embodiments of the bearing damper systems may include that at least one of (i) ends of the energy dissipating elements and (ii) end surfaces of the recesses of the housing comprise a coating selected to reduce friction between material of the respective energy dissipating elements and material of the housing during compression-release cycles of the energy dissipating elements.

According to some embodiments, aircraft engines are provided. The aircraft engines include a rotating component defining an axis, a bearing structure configured to rotationally support the rotating component, and a bearing damper system. The bearing damper system includes a housing arranged radially outward from the bearing structure relative to the axis, the housing defining a plurality of axially extending recesses arranged circumferentially about the axis and a set of energy dissipating elements, wherein one energy dissipating element of the set of energy dissipating elements is arranged within each recess of the housing and axially constrained within the respective recess, the energy dissipating elements arranged to receive a radial outward force from the bearing structure. Each energy dissipating element is arranged to be radially compressed while being axially constrained in response to a radial movement of the bearing structure toward the respective energy dissipating element and enter a loaded state wherein energy associated with said compression is absorbed into the material of the respective energy dissipating element. Each energy dissipating element is configured to convert at least a portion of the absorbed energy to heat and is configured to return to an unloaded state after removal of the load from the bearing structure.

In addition to one or more of the features described herein, or as an alternative, further embodiments of the aircraft engines may include that each energy dissipating element is made from a MAX Phase material.

In addition to one or more of the features described herein, or as an alternative, further embodiments of the aircraft engines may include that the plurality of energy dissipating elements define a first set of energy dissipating elements, the system further comprising a second set of energy dissipating elements, wherein the energy dissipating elements of the second set of energy dissipating elements are axially offset from the energy dissipating elements of the first set of energy dissipating elements.

In addition to one or more of the features described herein, or as an alternative, further embodiments of the aircraft engines may include that at least one of the housing and the energy dissipating elements comprises at least one anti-rotation feature configured prevent rotation of at least one end of the energy dissipating element during a compression-release cycle.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
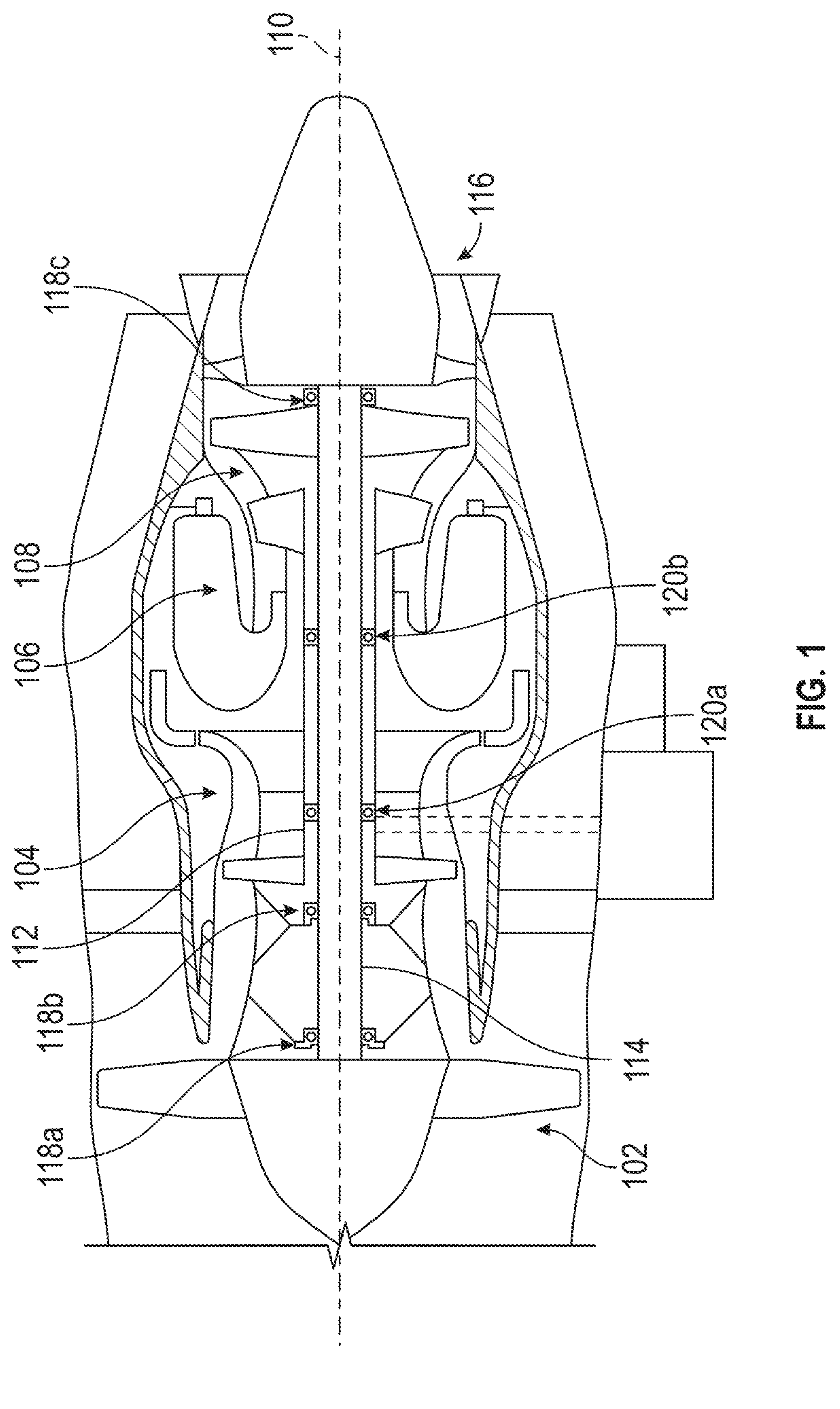
FIG. 1 is a schematic illustration of a gas turbine engine incorporating embodiments of the present disclosure.

FIG. 1 is a schematic illustration of a gas turbine engine 100, such as an aircraft engine. The gas turbine engine 100 may be representative of a main aircraft engine configured to generate power and/or thrust, an auxiliary power unit configured to generate power, or the like, as will be appreciated by those of skill in the art. The gas turbine engine 100, in this non-limiting illustrative configuration, includes a fan section 102, a compressor section 104, combustor section 106, and a turbine section 108. The gas turbine engine 100 may be configured with two spools or shafts arranged along an engine axis 110, such as with a high-speed shaft 112 and a low-speed shaft 114. In such configurations, the gas turbine engine 100 may include a low-pressure compressor of the compressor section 104 and a low-pressure turbine of the turbine section 108 each operably coupled to the low-speed shaft 114. Similarly, a high-pressure compressor of the compressor section 104 and a high-pressure turbine of the turbine section 108 may each be operably coupled to the high-speed shaft 112. It will be appreciated that other engine configurations are possible without departing from the scope of the present disclosure.

In operation, the fan section 102 is configured to direct at least a portion of a core flow into a core flow path that passes into the compressor section 104 for compression of the incoming air. The compressed air is then directed into the combustor section 106 for combustion with fuel. The combusted gases are then expanded through the turbine section 108, which drives rotation of the engine shafts 112, 114, and then the expanded combustion gases are expelled through a nozzle section 116 of the gas turbine engine 100. In some embodiments, the gas turbine engine 100 may be configured in a bypass arrangement, as will be appreciated by those of skill in the art.

As schematically illustrated in FIG. 1, the low-speed shaft 114 is rotationally supported within the gas turbine engine 100 by a number of axially spaced-apart bearing assemblies 118*a-c* that are concentrically mounted about the engine axis 110 of the gas turbine engine 100. The low-speed shaft 114 is supported at its front, upstream, or forward end by a first bearing assembly 118*a* and a second bearing assembly 118*b* and at a rear, downstream, or aft end thereof by a third bearing assembly 118*c*. The high-speed shaft 112 may be rotationally supported on the low-speed shaft 114 via a set of axially spaced-apart bearing assemblies, with a first bearing assembly 120*a* arranged at a front, upstream, or forward end of the high-speed shaft 112 and a second bearing assembly 120*b* arranged at a rear, downstream, or aft end of the high-speed shaft 112.

The arrangement of bearing assemblies for a particular gas turbine engine, including but not limited to the number and type of bearings selected, is typically determined by a number of factors specific to configuration and features of the gas turbine engine. Accordingly, the arrangement of bearing assemblies described herein is exemplary only and is not intended to be limiting. For example, and without limitation, the first and third bearings assemblies 118*a* and 118*c* may be roller bearings for radially supporting the low-speed shaft 114 and the second bearing assembly 118*b* may be a thrust bearing to provide both axial and radial support to the low-speed shaft 114. As shown, the first bearing assembly 118*a* is arranged adjacent the fan section 102 and the second bearing assembly 118*b* is arranged downstream from the first bearing assembly 118*b* along the low-speed shaft 114. The second bearing assembly 118*b*, in some configurations, may be arranged axially between a low-pressure compressor and a high-pressure compressor of the compressor section 104. The bearing assemblies 120*a-b* that support the high-speed shaft 112 may be roller bearing assemblies or the like and may be positioned at multiple axial locations along the high-speed shaft 112. It will be appreciated the bearing assemblies may be arranged in any suitable fashion, which may be determined by the specific engine configuration. The bearing assemblies 118*a-c*, 120*a-b*, and/or other bearing assemblies may be used to rotationally support rotating components of the gas turbine engine 100, such as the shafts 112, 114 and/or the rotating components of the fan section 102, the compressor section 104, and/or the turbine section 108 (e.g., rotors, fans, etc.).

The bearing assemblies 118*a-c*, 120*a-b* illustrated in FIG. 1, and/or other bearings within the gas turbine engine 100 may be configured with dampers to improve rotor stability, allow transit through resonance speeds without damaging hardware, decrease vibrations during operation of the gas turbine engine, and/or reduce vibrations transmitted from the engine to the airframe. Such dampers may be squeeze film dampers that are arranged between bearing outer races and associated bearing housings of the bearing assemblies. Typically, squeeze film dampers may require an added load path to center the rotor, such as a squirrel cage.

In view of the above and other considerations, in accordance with embodiments of the present disclosure, bearing support assemblies are provided that achieve damping and centering functionality, which may be used independently from or in combination with squeeze film dampers. In accordance with embodiments of the present disclosure, bearing support assemblies are arranged to support and absorb energy of associated bearing assemblies. Embodiments of the present disclosure include a series of energy dissipating elements (e.g., arc compression membrane dampers) made of energy dissipating material(s) that can absorb radial forces within the energy dissipating element, and dissipate at least a portion of the energy as heat, resulting in less energy being released when a load is removed. The energy dissipating elements may be arranged within the bearing support assembly and about a bearing assembly to act as linear dampers (linear in a radial direction). These energy dissipating elements are in turn supported within slots or recesses in a surrounding support structure of the bearing support assembly. The energy dissipating material, in accordance with embodiments of the present disclosure, may be any material that can absorb a portion of a load and convert such energy (e.g., strain energy) to heat while recovering fully to an initial shape when the load is removed.

For example, and without limitation, the energy dissipating material of embodiments of the present disclosure may be a MAX phase material (e.g., MAX phase ceramic). Some MAX phase materials are capable of converting a portion of imparted strain energy to heat (e.g., 10-40% of strain energy may be converted to thermal energy and dissipated as heat). MAX phase materials are materials having layered, hexagonal carbides and nitrides which have the general formula: $M_{n+1}AX_n$ (MAX), where n=1 to 4, M is an early transition metal, A is an A-group element, and X is carbon and/or nitrogen. The layered structure consists of edge-sharing, distorted $XM_6$ octahedra interleaved by single planar layers of the A-group element. Some example compositions of MAX phase materials that may be employed with embodiments of the present disclosure are: $Ti_3AlC_2$, $Ti_3GaC_2$, $Ti_3InC_2$, $V_3AlC_2$, $Ti_3SiC_2$, $Ti_3GeC_2$, $Ti_3SnC_2$, $Ta_3AlC_2$, $Ti_3ZnC_2$, $Zr_3AlC_2$. It will be appreciated that this is a non-exhaustive list, and other MAX phase materials may be employed without departing from the scope of the present disclosure.

As the engine operates, unbalance forces cause the rotating components (e.g., shafts, rotors, etc.) to move radially. In accordance with embodiments of the present disclosure, the energy dissipating elements are arranged to dampen and center the movement of the rotating component, thereby reducing the radial motion of the respective rotating component. For example, the energy dissipating elements may be circumferentially arranged or distributed about the circumference of the rotating component. The energy dissipating elements may be arranged in specific locations to allow for damping of movement of the respective rotating component in radial directions. During radial shifts of the rotating components, the energy dissipating elements will undergo a compressive load and convert part of the imparted strain energy to heat. When the force or load from the rotating component is removed, the energy dissipating elements will return to an uncompressed state. The returning force of the energy dissipating element on the rotating component (e.g., via a bearing outer race) will be less than the initial load, due to the heat dissipation.

In accordance with some embodiments, the heat is removed through radiation and conduction to a support housing of the energy dissipating elements. In other embodiments, optionally in combination with passive cooling, active cooling may be provided using a cooling fluid (e.g., liquid, gas, etc.) to aid in removal of heat from the energy dissipating elements. The energy dissipating elements may be preloaded in a neutral state so that the energy dissipating elements do not lose contact when deflection is in a direction opposite from the location of the energy dissipating element. In accordance with embodiments of the present disclosure, the energy dissipating elements are arcuate shapes, such as arc membranes. In accordance with some embodiments, the support of the energy dissipating elements may be achieved by inserting the energy dissipating elements into slots in the support housing. In accordance with embodiments of the present disclosure, the energy dissipating elements may provide multiple functionalities by operating as both a damper and a centering feature to a rotating component.

Figure 2A:
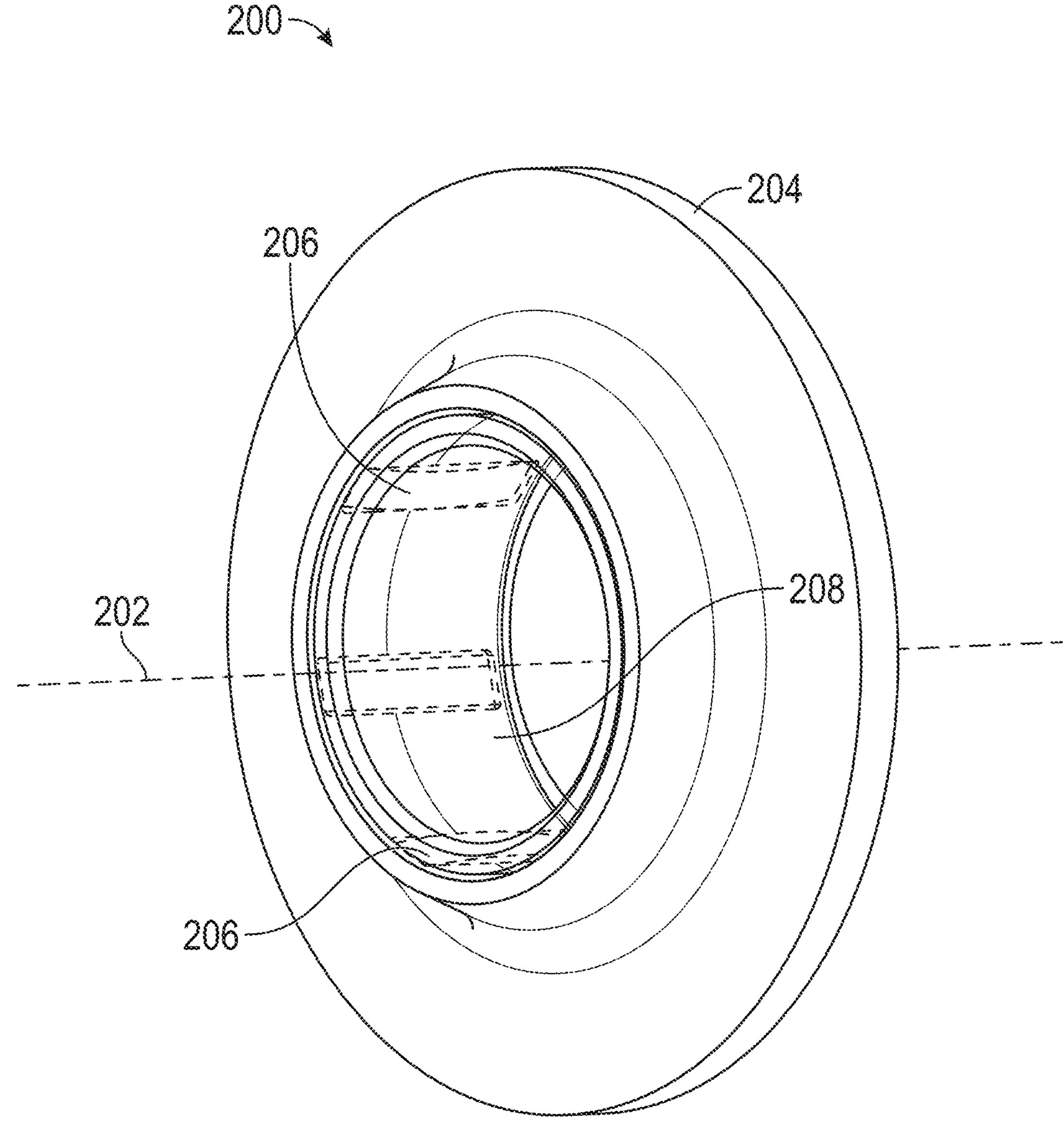
FIG. 2A is a perspective view of a bearing damper system in accordance with an embodiment of the present disclosure.
Figure 2C:
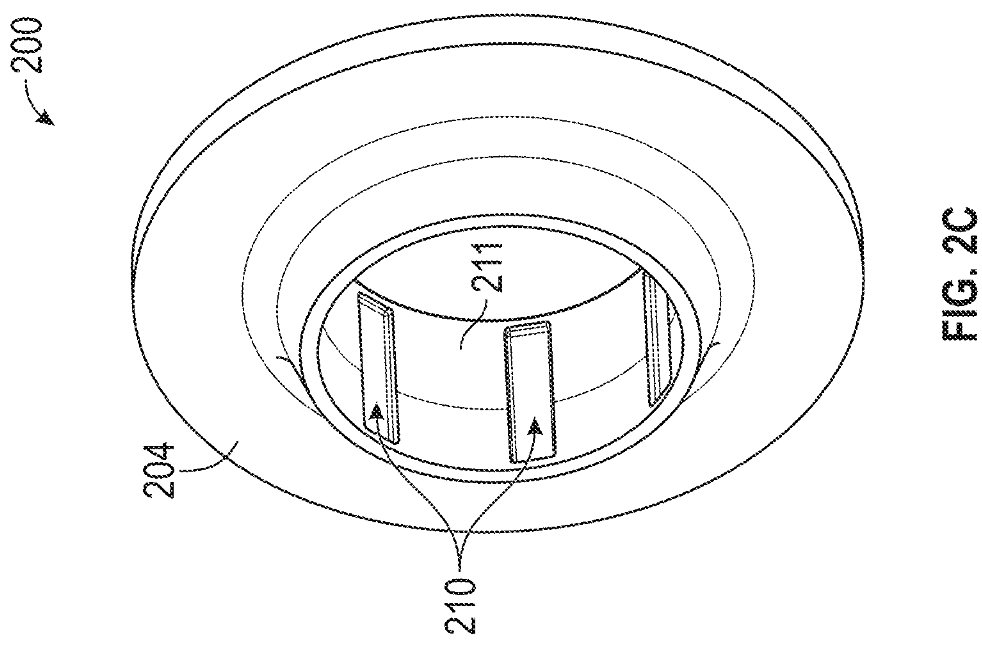
FIG. 2C illustrates the bearing damper system of FIG. 2A illustrating recesses formed in a housing of the bearing damper system.
Figure 2B:
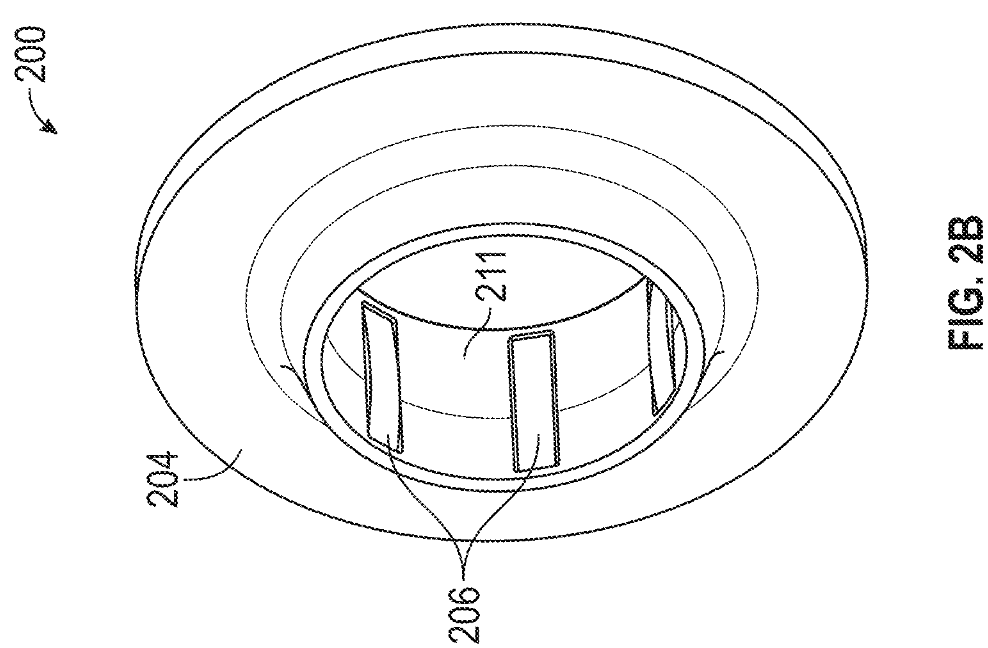
FIG. 2B illustrates the bearing damper system of FIG. 2A without a bearing structure present.
Figure 2D:
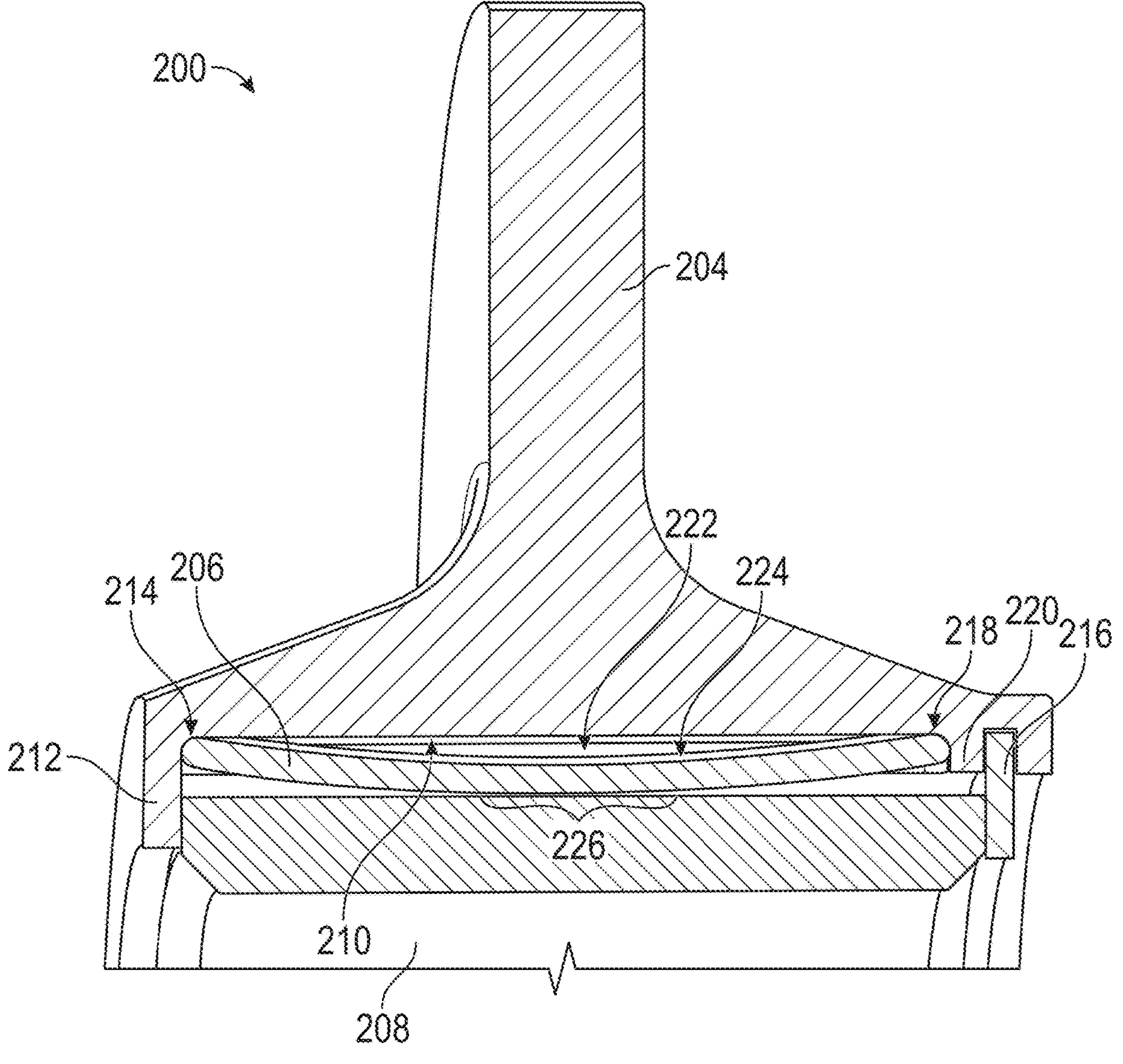
FIG. 2D illustrates an enlarged cross-sectional view of the energy dissipating elements of the bearing damper system of FIG. 2A viewed along the line 2D-2D shown in FIG. 2E.
Figure 2F:
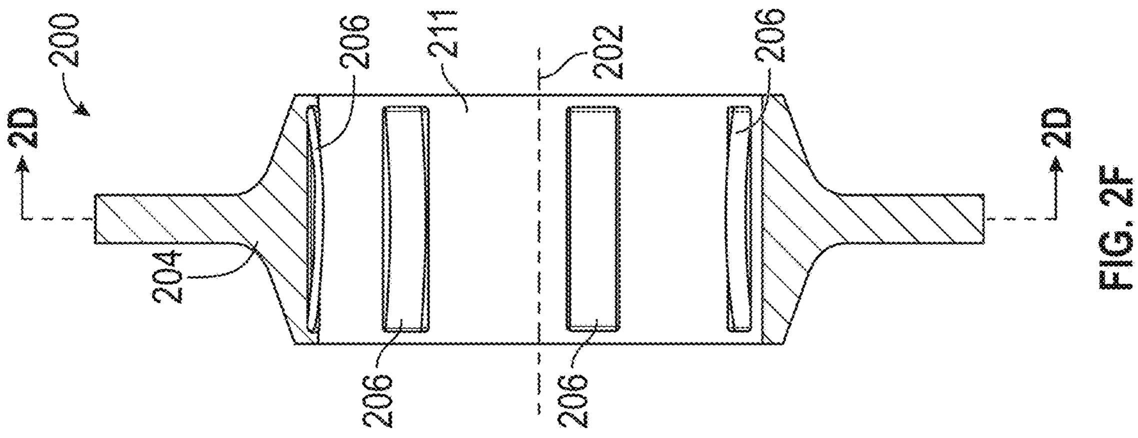
FIG. 2F is a cross-sectional view of the bearing damper system of FIG. 2A viewed along the line 2F-2F shown in FIG. 2E without a bearing structure present.
Figure 2E:
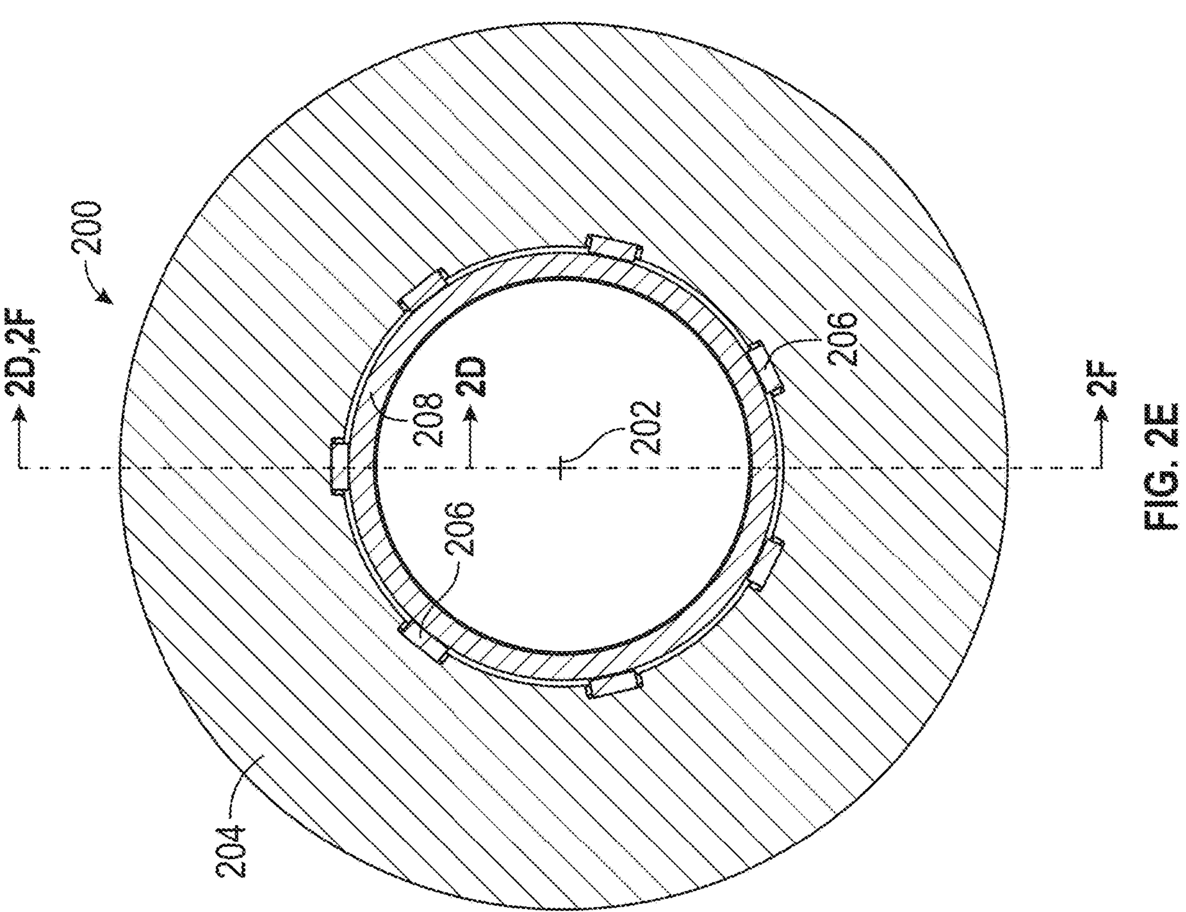
FIG. 2E is a cross-sectional view of the bearing damper system of FIG. 2A viewed along the line 2E-2E shown in FIG. 2F.

Referring now to FIGS. 2A-2F, schematic illustrations of a bearing damper system 200 in accordance with an embodiment of the present disclosure are shown. FIG. 2A is a perspective view of the bearing damper system 200 which is a hoop or annular structure that may be arranged along an engine axis, illustrated as axis 202. The bearing damper system 200 includes a housing 204 that supports a set of energy dissipating elements 206 that are arranged about a bearing structure 208. FIG. 2B illustrates the bearing damper system 200 without the bearing structure 208 present and FIG. 2C illustrates the bearing damper system 200 illustrating recesses 210 formed in the housing 204 that are provided to receive respective energy dissipating elements 206. FIG. 2D illustrates an enlarged cross-sectional view of the energy dissipating elements 206 viewed along the line 2D-2D shown in FIG. 2E, FIG. 2E is a cross-sectional view of the bearing damper system 200 viewed along the line 2E-2E shown in FIG. F, with the bearing structure 208 present, and FIG. 2F is a cross-sectional view of the bearing damper system 200 viewed along the line 2F-2F shown in FIG. E, with the bearing structure 208 omitted.

The set of energy dissipating elements 206 are arranged circumferentially about the axis 202 within recesses 210 formed within the housing 204. The energy dissipating elements 206 are configured to selectively engage with the bearing structure 208, such as a bearing outer race. The energy dissipating elements 206 are provided to absorb a portion of the energy caused by shifting of rotating components within the engine. For example, rotating components of engines may thermally expand radially outward during operation or may shift radially in one or more directions (e.g., whirl motion when the rotor is being deflected off a spin axis)). As these deflections and changes in radial position occur, the bearing structure 208 will be moved in a similar fashion, radially outward, inward, and/or off-center relative to the axis 202. As the bearing structure 208 is urged radially outward from the axis 202, the bearing structure 208 will apply a force upon the energy dissipating elements 206 that are arranged on the side of the bearing structure 208 in the direction of motion of the bearing structure 208. The energy dissipating elements 206, in this illustrative configuration, are a set of arcuate elements or membranes, which are formed from specific materials, such as MAX Phase materials. As the bearing structure 208 applies a radially outward force upon the energy dissipating elements 206, the energy dissipating elements 206 will be compressed within the housing 204.

In this example illustrative configuration, the energy dissipating elements 206 are arranged in respective recesses 210, such as slots, channels, grooves, or the like. The recesses 210 are axially extending features formed on a radially inner surface 211 of the housing 204 (e.g., as shown in FIGS. 2B-2C). The energy dissipating elements 206 may be inserted into the respective recesses 210 of the housing 204, and then the bearing structure 208 may be installed within the housing 204 with the energy dissipating elements 206 contacting an external surface of the bearing structure 208 (e.g., as shown in FIGS. 2D-2E).

As shown in FIG. 2D, the housing 204 may include a stop 212 for securing and positioning the bearing structure 208 within the housing 204 and ensure that the bearing structure 208 is positioned relative to the energy dissipating element (s) 206. In some configurations, when the bearing structure 208 is inserted into the housing 204, a first end 214 of the energy dissipating element 206 will contact a surface of the housing 204 at a corner defined by the inner surface 211 and the stop 212 of the housing 204. A locking element 216 may then be installed on the housing 204 to axially secure the bearing structure 208 axially within the housing 204. As shown in FIG. 2D, a second end 218 of the energy dissipating element 206 may engage with a support 220, which is part of the housing 204. The support 220 also provides a surface that receives and engages with the locking element 216 to secure the locking element 216 to the housing 204 and axially secure the bearing structure 208 within the housing 204. In other configurations, the energy dissipating element(s) 206 may be installed within slots or recesses defined in the housing 204 (e.g., axial ends/edges of the housing).

As shown in FIG. 2D, when installed, the energy dissipating element 206 defines a cavity 222 between an outer diameter surface 224 of the energy dissipating element 206 and a surface of the recess 210. The cavity 222 is formed due to the arcuate shape of the energy dissipating element 206. Due to the arcuate shape of the energy dissipating element 206, the energy dissipating element 206 will contact the bearing structure 208 at or along a contact region 226.

Because the energy dissipating elements 206 are axially bounded by the housing 204 (e.g., by the stop 212 and the support 220), when the bearing structure 208 travels or expands radially outward, it will compress the energy dissipating element 206 between the bearing structure 208 and the housing 204, thereby compressing the energy dissipating element 206. As the bearing element 208 compresses, energy is imparted into the energy dissipating element 206. That is, due to the arcuate nature of the energy dissipating element 206, and because the energy dissipating element 206 is axially constrained, the applied force from the bearing element 206 (radial force) will convert the flattening of the energy dissipating element 206 from what would be bending in an unconstrained compressed state to compression in the constrained compressed state. When the load is released, the energy dissipating element 206 will extend back to the normal state (prior to compression). As the energy dissipating element 206 compresses and absorbs energy and then recovers back to the unloaded state, a portion of the energy will be converted to heat. For example, the material of the energy dissipating element 206 may be selected to convert strain energy to heat, which may be absorbed by the housing 204 or by other means, such as by the mechanisms discussed below.

In some embodiments, and as shown in FIG. 2D, the energy dissipating elements 206 may be pre-loaded such that contact region 226 of the energy dissipating element 206 maintains constant contact with the surface of the bearing structure 208. In this configuration, the pre-loading may be achieved, initially by the act of installing the energy dissipating element 206 within the housing 204 between the stop 212 and the support 220. As the bearing structure 208 is configured to be installed axially into the housing 204, the energy dissipating element 206 will be compressed and pre-loaded as the bearing structure 208 travels along the surface of the energy dissipating element 206. When the bearing structure 208 is fully inserted into the housing 204, the locking element 216 may be installed to axially secure the bearing structure 208 in place and to ensure the pre-loading of the energy dissipating element 206. The locking element 216 may be a retention ring or the like.

In accordance with embodiments of the present disclosure, the bearing damper system 200 includes a set of the energy dissipating element 206 (e.g., arc membranes) made of energy dissipating material to act as a hysteresis damper. The energy dissipating element 206 are contained in the recesses 210 in the housing 204. The energy dissipating element 206 are put into bending, but the axial length of the energy dissipating element 206 is constrained by the stop 212 and the support 220 and therefore the energy dissipating element 206 is put into compression-bending and converts part of the imparted strain energy to heat. When a radial force from the rotating component is removed and the energy dissipating element 206 returns to its neutral state, the returning force of the energy dissipating element 206 on the bearing structure 208 will be less than the initial load. The reduction in returning force is achieved via heat dissipation from the energy dissipating element 206 into the housing 204 and/or a cooling fluid. The energy dissipating elements 206 are preloaded in the neutral state so that the energy dissipating elements 206 do not lose contact with the bearing structure 208 when deflection is in the opposite direction. In accordance with some embodiments. The arcuate shape of the energy dissipating element 206 is conducive to creating bearing supports which are low stiffness which may be desirable in some scenarios for rotor dynamic design. As noted above, the energy dissipating elements 206 can fill the role of damper and centering feature simultaneously.

Figure 3:
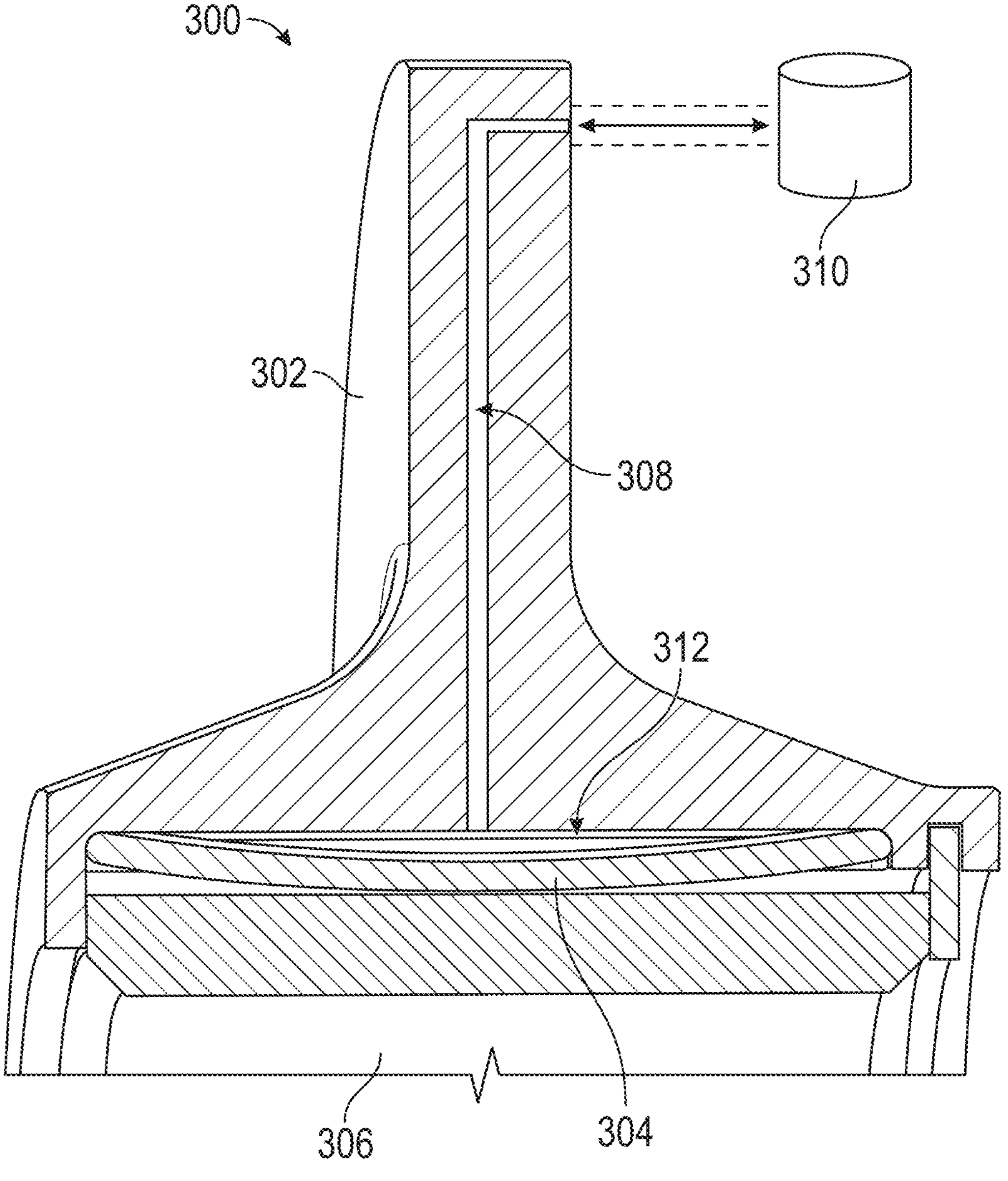
FIG. 3 is a schematic illustration of a portion of a bearing damper system in accordance with an embodiment of the present disclosure.

Referring now to FIG. 3, a schematic illustration of a portion of a bearing damper system 300 in accordance with an embodiment of the present disclosure is shown. The bearing damper system 300 may be substantially similar to that shown and described above with respect to FIGS. 2A-2F, and thus like features may not be described again for simplicity of illustration and discussion. The bearing damper system 300 includes a housing 302 that supports a set of energy dissipating elements 304 that are arranged about and in contact with a bearing structure 306. The primary difference between the bearing damper system 300 and the bearing damper system 200 is the mechanism of energy dissipation of the energy dissipating elements 304. In the bearing damper system 200, the energy absorbed into the energy dissipating elements 206 is released as heat into the material of the housing 204, and may be removed by air that passes over surfaces of the energy dissipating elements 206 (e.g., within the cavity 222 and/or on surfaces facing the bearing structure 208). In contrast, in the embodiment of FIG. 3, the energy dissipating elements 304 may be configured with active energy dissipation.

For example, as shown in FIG. 3, the housing 302 may be provided with cooling channels 308 that fluidly connect a fluid source 310 with a cavity 312 defined between the energy dissipating elements 304 and the housing 302. As such, a cooling fluid may be supplied into the cavities 312 to pick up heat from the energy dissipating elements 304. The cooling fluid may be gaseous (e.g., bleed air from an associated engine) or may be liquid (e.g., oil). In the case of oil as the cooling fluid, lubrication between the housing 302 and the energy dissipating element 304 may be provided to prevent unnecessary wear as the ends of the energy dissipating element 304 shift, move, or rotate during compression and expansion. It will be appreciated that the use of oil as a cooling fluid may require additional considerations, such as ensuring that a maximum oil temperature is not exceeded during the release of energy from the energy dissipating element 304 into the cooling fluid. In embodiments that employ air as the cooling fluid, the flow need only be set so that maximum temperature of the base materials (e.g., the housing 302, the energy dissipating elements 304, etc.) is not exceeded. Although FIG. 3 illustrates a single energy dissipating element 304, it will be appreciated that each energy dissipating element arranged within the housing 302 may include a respective cooling channel 308 that fluidly couples a respective cavity with the fluid source 310.

Figure 4B:
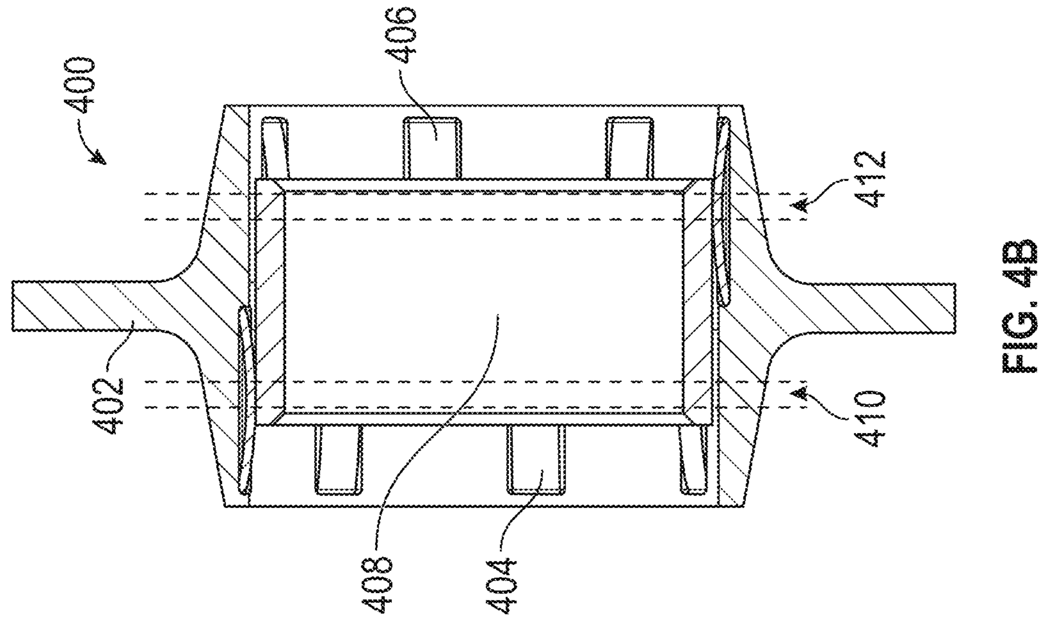
FIG. 4B is a schematic illustration of the bearing damper system of FIG. 4A shown with a bearing structure present.
Figure 4A:
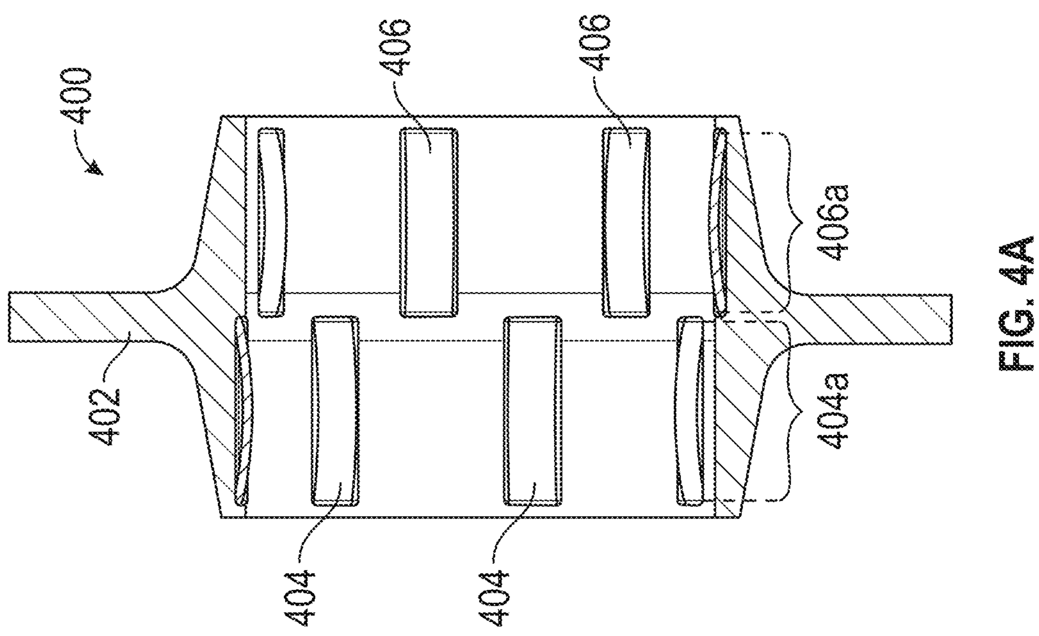
FIG. 4A is a schematic illustration of another configuration of a bearing damper system in accordance with an embodiment of the present disclosure, shown without a bearing structure present.

Referring now to FIGS. 4A-4B, schematic illustrations of a bearing damper system 400 in accordance with an embodiment of the present disclosure are shown. FIG. 4A illustrates a housing 402 with two sets of energy dissipating elements, with a first set 404*a* of energy dissipating elements 404 arranged with a forward arrangement within the housing 402 and a second set 406*a* of energy dissipating elements 406 arranged with an aft arrangement within the housing 402. That is, the axial position of the first set 404*a* of energy dissipating elements 404 and the second set 406*a* of energy dissipating elements 406 are axially offset from each other. In accordance with some embodiments, in addition to being axially offset from each other, the individual energy dissipating elements 404 of the first set 404*a* are circumferentially offset from the individual energy dissipating elements 406 of the second set 406*a*. In other embodiments, the individual energy dissipating elements of the two sets may be circumferentially aligned, and only axially offset from each other.

Due to the axial offset between the first and second sets of energy dissipating elements 404, 406, the respective energy dissipating elements 404, 406 will contact a bearing structure 408 at different axial positions. For example, the first set of energy dissipating elements 404 will contact the bearing structure 408 at or along a first contact region 410. Similarly, the second set of energy dissipating elements 406 will contact the bearing structure 408 at or along a second contact region 412. In configurations that employ the circumferential offset in addition to the axial offset, the centering, damping, balancing properties may be increased as compared to a configuration that has circumferential alignment between the elements.

Although shown in FIGS. 4A-4B with two sets of energy dissipating elements, such configuration is not intended to be limiting. In other embodiments, more than two sets may be employed without departing from the scope of the present disclosure. The sets of energy dissipating elements may be arranged with both axial and circumferential offsets, providing different contact regions with the bearing structure.

Figure 5:
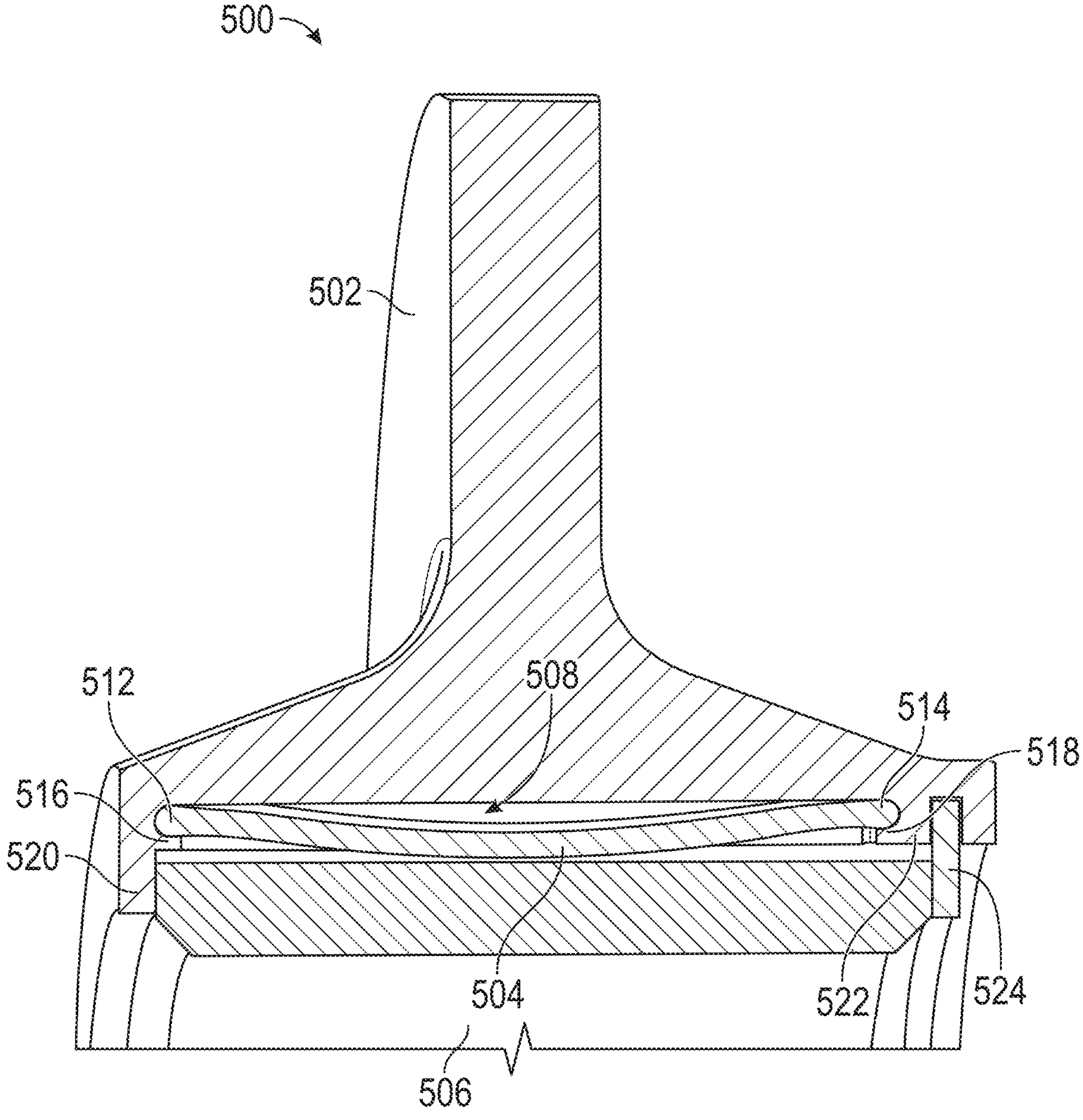
FIG. 5 is a schematic illustration of a portion of a bearing damper system in accordance with another embodiment of the present disclosure.

Referring now to FIG. 5, a schematic illustration of a portion of a bearing damper system 500 in accordance with an embodiment of the present disclosure is shown. The bearing damper system 500 may be substantially similar to that shown and described above, and thus like features may not be described again for simplicity of illustration and discussion. The bearing damper system 500 includes a housing 502 that supports a set of energy dissipating elements 504 that are arranged about and arranged in contact with a bearing structure 506. In this configuration, the energy dissipating elements 504 are arranged in respective recesses 508 that are defined within the housing 502.

To address possible fretting due to rotation at a first end 512 and a second end 514 of the energy dissipating elements 504 during a compression-release cycling end features may be provided. Rotation at the ends 512, 514 of the energy dissipating element 504 may be constrained by respective anti-rotation features 516, 518. The anti-rotation features 516, 518 of this illustrative embodiment are part of the housing 502. As shown, a first anti-rotation feature 516 extends axially in an aftward direction from a stop 520 of the housing 502. The stop 520, as described above, is provided as a forward end stop element to support the bearing structure 506 within the housing 502. At the aft end, the housing 502 includes a second anti-rotation feature 518 that extends axially forward from a support 522 of the housing 502. The support 522 is configured to define the second anti-rotation feature 518 and provide a surface to support a locking element 524 that is configured axially secure the bearing structure 506 within the housing 502. The anti-rotation features 516, 518 prevent the ends 512, 514 of the energy dissipating elements 504 from rotating relative to the material surfaces of the housing 502, thereby reducing or preventing frictional wear during the compression-release cycling of the energy dissipating elements 504.

Figure 6:
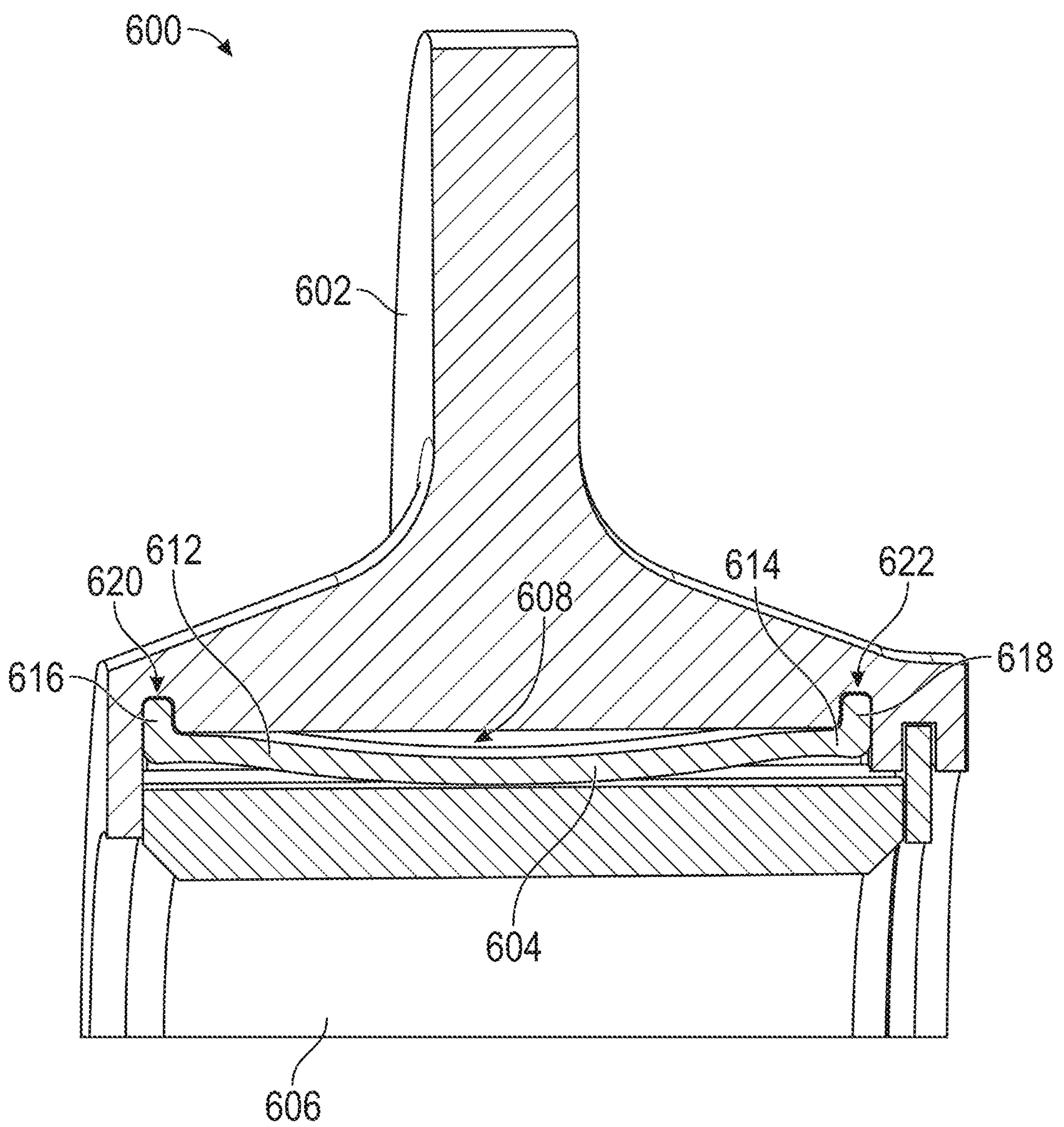
FIG. 6 is a schematic illustration of another configuration of a bearing damper system in accordance with an embodiment of the present disclosure.

Referring now to FIG. 6, a schematic illustration of a portion of a bearing damper system 600 in accordance with an embodiment of the present disclosure is shown. The bearing damper system 600 may be substantially similar to that shown and described above, and thus like features may not be described again for simplicity of illustration and discussion. The bearing damper system 600 includes a housing 602 that supports a set of energy dissipating elements 604 that are arranged about and arranged in contact with a bearing structure 606. In this configuration, the energy dissipating elements 604 are arranged in respective recesses 608 that are defined within the housing 602.

To address possible fretting due to rotation at a first end 612 and a second end 614 of the energy dissipating elements 604 during a compression-release cycling end features may be provided. Rotation at the ends 612, 614 of the energy dissipating element 604 may be constrained by respective anti-rotation features 616, 618. The anti-rotation features 616, 618 of this illustrative embodiment are part of the energy dissipating elements 604. As shown, a first anti-rotation feature 616 extends radially outward from the energy dissipating elements 604 at the first end 612 and into a respective first slot 620. The slot 620 is formed in the housing 602 and is defined at a forward end of the recess 608 and shaped to receive the first anti-rotation feature 616. At the aft end, the housing 602 includes a second slot 622 configured to receive the second anti-rotational feature 618 at the second end 614 of the energy dissipating element 604. The anti-rotation features 616, 618 prevent the ends 612, 614 of the energy dissipating elements 604 from rotating relative to the material surfaces of the housing 602, thereby reducing or preventing frictional wear during the compression-release cycling of the energy dissipating elements 604.

In the embodiments of FIGS. 5-6, the anti-rotation features provide for mechanical mechanisms for reducing wear on the ends of the respective energy dissipating elements. In some embodiments, in combination with the anti-rotation features, or in embodiments without such anti-rotation features, a coating may be applied to the ends of the energy dissipating elements and/or surfaces of the recesses in which the energy dissipating elements are installed. Such coatings may include, but are not limited to, tungsten carbide in a cobalt matrix, copper-nickel-indium, or other coatings based on fluoropolymers.

In some embodiments of the present disclosure, additional centering features may be provided. For example, in accordance with some embodiments of the present disclosure, a bearing damper system as shown and described above may be combined with a squeeze film damper or other type of centering assembly or structure.

Figure 7:
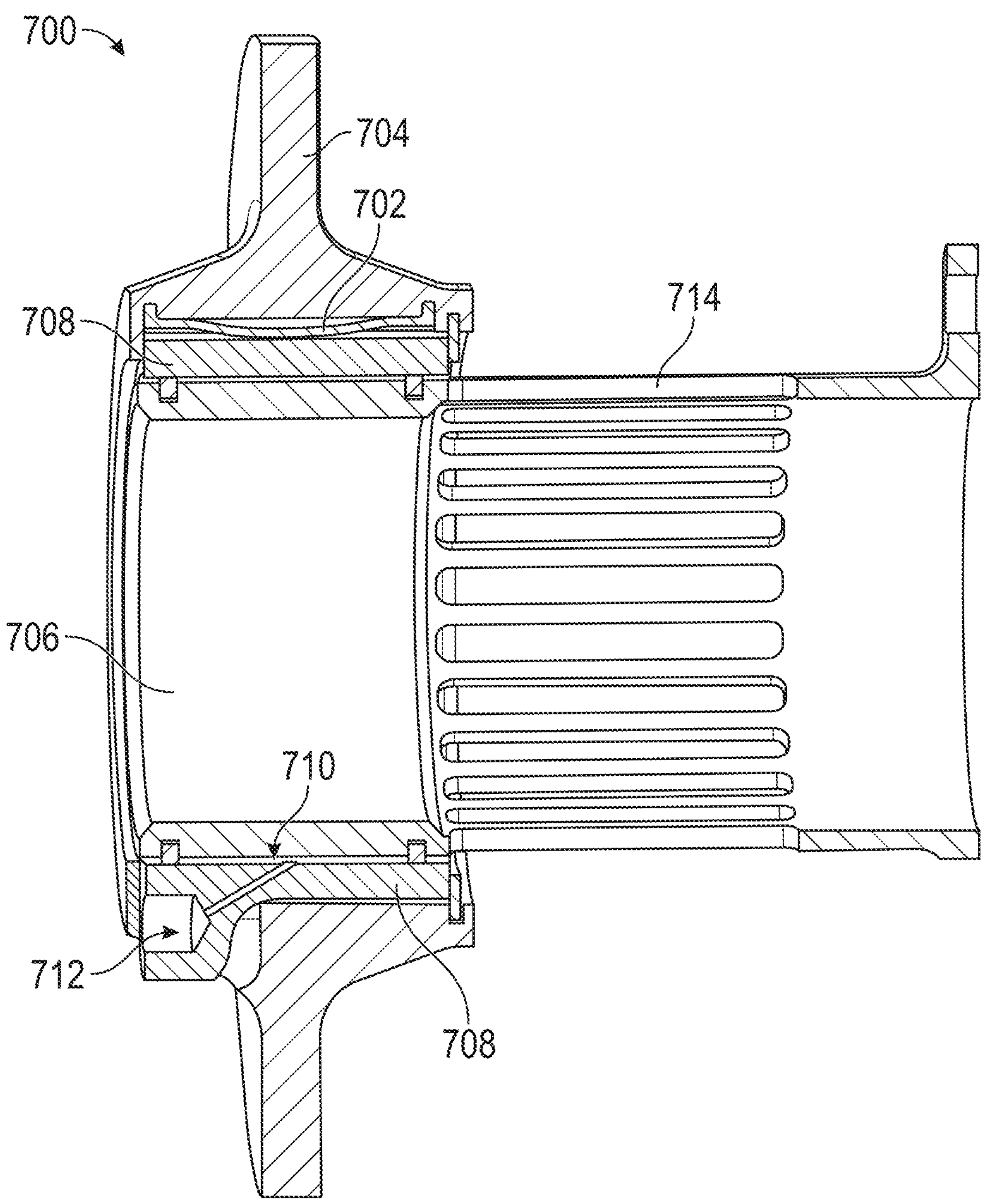
FIG. 7 is a schematic illustration of another configuration of a bearing damper system in accordance with an embodiment of the present disclosure.

For example, referring now to FIG. 7, a schematic illustration of a bearing damper system 700 in accordance with an embodiment of the present disclosure is shown. The bearing damper system 700 is configured with an energy dissipating element 702 arranged within a housing 704 and configured to support and absorb energy from a bearing structure 706. In this configuration, an intermediate structure 708 is arranged radially between the bearing structure 706 and the energy dissipating element 702 (and housing 704). The intermediate structure 708 is arranged to form a squeeze film damper 710 between the intermediate structure 708 and the bearing structure 706 (e.g., outer race of bearing). The squeeze film damper 710 is configured to receive a working fluid (e.g., oil) from a working fluid source 712, such as a reservoir, oil supply, or the like, as will be appreciated by those of skill in the art.

The energy dissipating element 702 is configured to receive radial direction force via interaction with the intermediate structure 708, which in turn may be moved radially via interaction with the bearing structure 706. In some embodiments, a working fluid provided to the squeeze film damper 710 and a working fluid provided to the energy dissipating element 702 (e.g., for cooling) may be the same (e.g., oil). In other embodiments, the two working fluids may be different. For example, in a non-limiting example, the working fluid in the working fluid source 712 for the squeeze film damper 710 may be oil and a working or cooling fluid supplied into and along the energy dissipating element 702 may be air.

In this configuration, the bearing damper system 700 provides for two types of damping arranged in series, in the radial direction. Starting from a central axis, the arrangement of components in a radially outward direction proceeds with the bearing structure 706, the squeeze film damper 710, the intermediate structure 708, and then the energy dissipating element 702 and housing 704. In this non-limiting embodiment, a set of the energy dissipating elements 702 made of energy dissipating material (e.g., MAX Phase material) are arranged to act as linear dampers. The squeeze film damper 710 is arranged in series with the energy dissipating elements 702, thus increasing the damped radial travel beyond what is possible in a system having only a squeeze film damper. The working fluid of the squeeze film damper 710 (e.g., oil) may be separate from the cooling flow of the working fluid for the energy dissipating elements 702 due to the intermediate element 708 which may fluidly separate the two working fluids (e.g., enabling air cooling of the energy dissipating elements 702).

In this configuration, with the two types of damping arranged in series, an additional centering feature may be provided for ensuring centering of the bearing structure 706. As such, as shown, an optional squirrel cage 714 may be provided for such centering functionality. In accordance with some embodiments that include the intermediate structure 708, the energy dissipating elements 702 will not directly apply force to the bearing structure 706. As a result, the centering functionality provided in embodiments with direct contact may be less effective. Accordingly, the squirrel cage 714 can provide additional centering functionality while also maximizing the damping provided by the bearing damper system 700, which includes both the squeeze film damper 710 and the energy dissipating elements 702. As noted, the configuration shown in FIG. 7 is a series configuration.

Advantageously, embodiments of the present disclosure are directed to improved damper and centering assemblies for bearings, such as for use on gas turbine engines and/or other aircraft engines. In accordance with some embodiments of the present disclosure, bearing damper systems are configured to support bearing structures to provide centering and damping functionality. The bearing damper systems, in accordance with some embodiments, include a series or set of energy dissipating elements (e.g., arcuate elements or membranes) made of energy dissipating material (e.g., MAX Phase material) to act as a linear damper. The energy dissipating elements are supported within recesses within a surrounding housing, which provides stability and structural support to the energy dissipating elements.

In accordance with embodiments of the present disclosure, the energy dissipating material any material that can absorb a portion of a load (e.g., strain, compression, etc.) and convert at least a portion of the energy to heat while recovering or rebounding to an initial shape when the load is removed. As discussed above, an example material for such energy dissipation may be MAX phase materials, and as a specific non-limiting example, MAX phase ceramics. Such MAX phase materials may be capable of converting at least 20% of imparted strain energy due to load to heat during a return to an unloaded state. In operation and as the engine functions, unbalance forces may cause the rotating component (e.g., rotor, shaft, etc.) to move and/or shift radially relative to a central axis through the rotating component. The rotating component may be rotationally supported on one or more bearing assemblies or bearing structures. As such, when the rotating component is shifted radially, the bearing structure will also shift radially.

In normal operation, the rotating component is centered and not applying any load to the energy dissipating elements (e.g., unloaded state). However, during such shifts in radial position of the rotating component (e.g., rotor whirls under unbalance and/or shifts due to engine maneuvers), the bearing structure will also shift and apply force to the energy dissipating elements (e.g., loaded state). The energy dissipating elements will undergo a compressive load. During the loaded state, the energy dissipating elements convert part of the imparted strain energy to heat, which is absorbed into a housing or working fluid. When the force from the rotating component and bearing structure is removed and the energy dissipating elements return to an uncompressed state or unloaded state, the returning force of the energy dissipating elements on the bearing structure will be less than the initial load. In accordance with some embodiments, the energy dissipating elements may return to an original shape after removal of a load, and thus transitioning from a loaded state to an unloaded state may be a return of the energy dissipating element back to its original (unloaded) shape.

In accordance with some embodiments of the present disclosure, the bearing damper system may be provided with no active cooling (e.g., FIGS. 2A-2B). In such configurations, heat is removed through radiation and conduction to the housing that supports the energy dissipating elements. In accordance with some embodiments, the energy dissipating elements may be preloaded in a neutral state so that the energy dissipating elements do not lose contact with the bearing structure when deflection is in a direction opposite or away from the energy dissipating element.

In accordance with embodiments of the present disclosure, the damping provided by the energy dissipating elements may be relatively significant due to the compression of the arcuate shapes thereof. Due to the nature of the energy dissipating elements, the energy dissipating elements are spring-like and may be compressed between the rotating component and the housing and then rebounding back to an unloaded state with a portion of the energy dissipated as heat. The energy dissipating elements operate as dampers and centering feature simultaneously for the rotating component (e.g., shaft supported on bearing structure).

Accordingly, in accordance with embodiments of the present disclosure, improved damping and centering of rotating components of gas turbine engines is provided. The damping and centering may be provided by a single passive assembly that is arranged about the bearing structure, including a housing with a set of energy dissipating elements disposed within the housing. The energy dissipating elements are arranged to continuously contact a surface of the bearing structure and radially position the bearing structure (and other rotating component elements) at the center thereof, thereby providing a centering functionality. Such energy dissipating elements may also absorb radial deflection energy and convert it to heat which is removed, thereby reducing the energy that is present in the system during a deflection of the rotating component. In some embodiments, active cooling and/or lubrication may be provided to the energy dissipating elements. In still further embodiments, the energy dissipating elements may be arranged in combination with a squeeze film damper, either in series or parallel, to further increase the amount of radial deflection damping provided by the bearing damper systems disclosed herein.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A bearing damper system for a gas turbine engine comprising:

a bearing structure arranged about an axis;

a housing arranged radially outward from the bearing structure relative to the axis, the housing defining a plurality of axially extending recesses arranged circumferentially about the axis; and a set of energy dissipating elements, wherein one energy dissipating element of the set of energy dissipating elements is arranged within each recess of the housing and axially constrained within the respective recess, the energy dissipating elements arranged to receive a radial outward force from the bearing structure, wherein each energy dissipating element is arranged to be radially compressed while being axially constrained in response to a radial movement of the bearing structure toward the respective energy dissipating element and enter a loaded state wherein energy associated with said compression is absorbed into a material of the respective energy dissipating element, wherein each energy dissipating element is configured to convert at least a portion of the absorbed energy to heat, and wherein each energy dissipating element is configured to return to an unloaded state after removal of a load from the bearing structure.

2. The bearing damper system of claim 1, wherein each energy dissipating element is made from a MAX Phase material.

3. The bearing damper system of claim 2, wherein each energy dissipating element is made from a MAX Phase ceramic.

4. The bearing damper system of claim 1, wherein each energy dissipating element is maintained under a preload that applies a radial inward force to the bearing structure.

5. The bearing damper system of claim 1, wherein a cavity is defined between a surface of each energy dissipating element and a surface of a respective recess of the housing.

6. The bearing damper system of claim 5, wherein the housing comprises one or more cooling channels configured to receive a working fluid and direct the working fluid into a respective cavity associated with each of the plurality of energy dissipating elements.

7. The bearing damper system of claim 1, wherein the plurality of energy dissipating elements define a first set of energy dissipating elements, the bearing damper system further comprising a second set of energy dissipating elements, wherein the energy dissipating elements of the second set of energy dissipating elements are axially offset from the energy dissipating elements of the first set of energy dissipating elements.

8. The bearing damper system of claim 7, wherein the energy dissipating elements of the second set of energy dissipating elements are circumferentially offset from the energy dissipating elements of the first set of energy dissipating elements.

9. The bearing damper system of claim 1, wherein the bearing structure is retained within the housing in an axial direction between a stop of the housing and a locking element.

10. The bearing damper system of claim 1, further comprising an intermediate structure arranged between the energy dissipating elements and the bearing structure, wherein the intermediate structure contacts the energy dissipating elements on one side and the bearing structure on an opposite side.

11. The bearing damper system of claim 10, further comprising a squeeze film damper defined between the intermediate structure and the bearing structure.

12. The bearing damper system of claim 10, wherein the bearing structure comprises a squirrel cage.

13. The bearing damper system of claim 1, wherein the material of each energy dissipating element is formed from a material that converts at least 20% of strain energy to heat.

14. The bearing damper system of claim 1, wherein the housing comprises at least one anti-rotation feature defined at an end of the recess and configured to receive an end of an energy dissipating element to prevent rotation of the end of the energy dissipating element during a compression-release cycle.

15. The bearing damper system of claim 1, wherein each energy dissipating element comprises at least one anti-rotation feature defined at an end of the respective energy dissipating element, wherein the at least one anti-rotation feature is configured to engage with a slot defined within the housing to prevent rotation of the end of the energy dissipating element during a compression-release cycle.

16. The bearing damper system of claim 1, wherein at least one of ends of the energy dissipating elements and end surfaces of the recesses of the housing comprise a coating selected to reduce friction between the material of the respective energy dissipating elements and material of the housing during compression-release cycles of the energy dissipating elements.

17. An aircraft engine comprising:

a rotating component defining an axis;

a bearing structure configured to rotationally support the rotating component; and a bearing damper system comprising:

a housing arranged radially outward from the bearing structure relative to the axis, the housing defining a plurality of axially extending recesses arranged circumferentially about the axis; and a set of energy dissipating elements, wherein one energy dissipating element of the set of energy dissipating elements is arranged within each recess of the housing and axially constrained within the respective recess, the energy dissipating elements arranged to receive a radial outward force from the bearing structure, wherein each energy dissipating element is arranged to be radially compressed while being axially constrained in response to a radial movement of the bearing structure toward the respective energy dissipating element and enter a loaded state wherein energy associated with said compression is absorbed into a material of the respective energy dissipating element, wherein each energy dissipating element is configured to convert at least a portion of the absorbed energy to heat, and wherein each energy dissipating element is configured to return to an unloaded state after removal of a load from the bearing structure.

18. The aircraft engine of claim 17, wherein each energy dissipating element is made from a MAX Phase material.

19. The aircraft engine of claim 17, wherein the plurality of energy dissipating elements define a first set of energy dissipating elements, the bearing damper system further comprising a second set of energy dissipating elements, wherein the energy dissipating elements of the second set of energy dissipating elements are axially offset from the energy dissipating elements of the first set of energy dissipating elements.

20. The aircraft engine of claim 17, wherein at least one of the housing and the energy dissipating elements comprises at least one anti-rotation feature configured to prevent rotation of at least one end of the energy dissipating element during a compression-release cycle.

* * * * *